United States Patent [19]
Johnson et al.

[11] Patent Number: 5,330,619
[45] Date of Patent: Jul. 19, 1994

[54] METHOD FOR REPULPING FIBROUS MATERIALS CONTAINING CROSSLINKED POLYAMIDE WET STRENGTH AGENTS WITH ENZYME

[75] Inventors: Mark A. Johnson, Chillicothe; Alexander R. Pokora; Joseph B. Henry, both of Pickerington, all of Ohio

[73] Assignee: The Mead Corporation, Dayton, Ohio

[21] Appl. No.: 12,039

[22] Filed: Feb. 1, 1993

[51] Int. Cl.$^5$ .............................................. D21C 5/02
[52] U.S. Cl. ........................................ 162/5; 162/72; 435/278
[58] Field of Search .................. 162/5, 72, 72 B, 158; 435/277, 278

[56] References Cited

U.S. PATENT DOCUMENTS

| | | | |
|---|---|---|---|
| 2,834,809 | 5/1958 | Schutte et al. | 162/117 |
| 3,966,543 | 6/1976 | Cayle et al. | 162/158 |
| 4,009,313 | 2/1977 | Crawford et al. | 428/290 |
| 4,330,365 | 5/1982 | Tessler | 162/168 |
| 4,450,048 | 5/1984 | Schulz | 162/5 |
| 4,461,648 | 7/1984 | Foody | 127/37 |
| 4,649,113 | 3/1987 | Gould | 435/165 |
| 4,663,043 | 5/1987 | Molin et al. | 210/603 |
| 4,842,877 | 6/1989 | Tyson | 426/271 |
| 4,980,023 | 12/1990 | Salkinoja-Salonen | 162/158 |
| 5,023,097 | 6/1991 | Tyson | 426/271 |

FOREIGN PATENT DOCUMENTS 656395  1/1963  Canada ................................. 162/5

OTHER PUBLICATIONS

Condensed Chemical Dictionary, polyamide, p. 828, 1981.
Bell, Huang and Knox, "Synthesis and Testing of Polymers Susceptible to Hydrolysis by Protective Enzyme." U.S. Army Natick Labs, Aug. 1974.
Espy, "The Chemistry of Wet-Strength Broke Repulping," Progress in Paper Recycling, pp. 17-23, Aug. 1992.
Andreoni, Baggi, and Manfrin, "Prospects and Limits of Bio-degradability of Synthetic Polyimides," Ann. Microbiol. Enzimol., 40(1), 61-71, 1990.

*Primary Examiner*—Karen M. Hastings
*Attorney, Agent, or Firm*—Thompson, Hine and Flory

[57] ABSTRACT

A method for treating fibrous sheet materials such as paper or paperboard containing polyamide resin as a wet strength agent which comprises reacting the fibrous materials with an enzyme to hydrolyze the resin and thereby improve repulping of the fibrous materials.

12 Claims, No Drawings

METHOD FOR REPULPING FIBROUS MATERIALS CONTAINING CROSSLINKED POLYAMIDE WET STRENGTH AGENTS WITH ENZYME

BACKGROUND OF THE INVENTION

This invention relates to a method for repulping fibrous sheet materials such as paper or paperboard which contain wet strength agents. Specifically, the invention is directed to the repulping of paper and paperboard fibers which have been treated with polyamide wet strength resins.

Polyamides are widely used in the paper industry as wet strength agents for treating fibrous materials such as paper, paperboard, etc. However such polyamide resin-treated fibrous materials are very difficult to repulp because of the structural stability of the polyamide chain. Polyamides used as wet strength agents in paper and paperboard products are commonly derived from adipic acid and diethylenetriamine followed by crosslinking with epichlorohydrin. Examples of such polyamides include Kymene, Kymene 557 and Kymene AK manufactured by Hercules, Inc.; Cascamid C2, C25 and C1600 manufactured by Borden Chemical; and Disco Strength 5800 manufactured by Callaway Chemical.

Present methods for repulping fibrous materials containing polyamide wet strength resins require extreme conditions such as a pH of 10 or greater and temperatures of 160° F. or more, or they require the presence of strong oxidizing agents.

Repulping fibers at high pH and high temperature is unsatisfactory for several reasons. Because papermaking machines are generally operated at a neutral or near neutral pH, if repulped fibers prepared at high pH are used to prepare recycled papers, a pH adjustment with acids would be required. High pH can cause damage to the repulped fiber and furthermore any adjustment of pH requires an additional step in the repulping method which is undesirable from an operational standpoint. Elevated temperatures are undesirable because they add increased energy costs to the method.

Other methods for repulping polyamide treated papers require the use of strong oxidizing agents to degrade the polyamides. Generally these other methods do not require the extreme operating conditions of high pH and high temperature, but such strong oxidizing agents may cause the formation and production of undesirable byproducts.

Melamine-formaldehyde polymers have also been employed as wet strength agents for fibrous materials. Fibers treated with melamine-formaldehyde resins do not generally show the difficulties associated with polyamides in the repulping of the fiber, however, questions associated with the safety of the use formaldehyde in making theses resins makes the use of melamine-formaldehyde resins undesirable. Efforts have been undertaken to design wet strength resins which are compatible with repulping operations, however, the resins which have been designed have not been completely satisfactory.

As a result of the difficulties encountered repulping papers containing polyamide wet strength agents, these papers are often not recycled. Therefore, a method is highly desirable wherein papers containing polyamide wet strength resins can be easily repulped.

SUMMARY OF THE INVENTION

It has now been found that fibrous materials such as paper or paperboard which contain polyamide resins as wet strength agents can be easily and conveniently repulped in the presence of certain enzymes.

DETAILED DESCRIPTION OF THE INVENTION

In accordance with the present invention, a method for repulping fibrous sheet materials such as paper and paperboard containing a polyamide wet strength resin is provided wherein that method comprises treating the material with an enzyme capable of hydrolyzing said wet strength resin under conditions which promote depolymerization or degradation of the polyamide resin.

In accordance with the invention, the enzymes used to hydrolyze the wet strength resin may be introduced into a conventional repulping process using the same equipment in a continuous or semi-continuous operation. For example, hydropulpers are conventionally used in repulping paper and board. The enzyme may be added using the same equipment currently used to introduce additives for controlling pH in a continuous or semicontinuous operation. Typically, retention times for the enzyme with the fiber may be up to one hour in a semi-continuous operation. The enzyme treatment may also be conducted as part of a two-stage repulping operation where the addition of enzyme and the enzyme repulping operation precedes the more severe conventional repulping operations.

The enzymes useful in the present invention are hydrolyzing enzymes such as proteases, cellulases, lactamases, and amidases which effect depolymerization or degradation of the polyamide resins. Such hydrolyzing enzymes may be employed alone or they may be used as a mixture provided that the mixture does not deleteriously affect the hydrolyzing action of the enzymes. A preferred enzyme is a protease enzyme such as bromelain, pepsin, trypsin, alcalase, savinase, proteinase K, and the like. Mixtures of such protease enzymes are also useful in the present invention. A particularly useful commercial protease mixture is Ultrasil 53 (TM), a mixture of enzymes available from Klenzade, a division of Ecolab, Inc.

The enzymes are selective in terms of both the substrates with which they will react and the conditions (e.g., pH and temperature) under which they will react. Consequently, it may be necessary to screen the enzymes and the conditions in order to successfully hydrolyze a particular wet strength resin. In some instances where industry uses a number of wet strength resins it may be desirable to use a combination of enzymes and reaction conditions in order to achieve an efficient repulping operation.

The amount of hydrolyzing enzyme employed to effectively carry out the present invention is dependent upon several factors as discussed below in more detail but it is generally within the range of 1 to 400 units/g pulp fiber (dry weight), and preferably, about 10 to 50 units/g. One unit of protease is defined as that amount which will hydrolyze casein to produce color equivalent to 1.0 $\mu$mmol (181 mg) of tyrosine per min. at pH 7.5 at 36° C. (color by Folin-Ciocalteu reagent).

Repulping conditions will vary with the nature of the enzyme, the wet strength resin and the paper or board being repulped. As previously indicated, the enzymes are sensitive to pH, temperature, ionic strength certain enzymes will be more effective if certain enzyme cofactors are present. The repulping method is advantageously carried out at a neutral or near neutral pH. Preferably, the pH is in the range of about 4 to 10. The temperature requirements for the repulping method of the present invention are typically considerably milder than those of previous methods. For example, the present method may be conducted at temperatures less than about 70° C. Typically, the repulping temperature is in the range of about 20° to 50° C. and most preferably about 40° to 45° C. Some proteases are more effective when calcium ion, a cofactor, is present. Sulfhydryl proteases such as bromelain and papain are more effective under reducing conditions in which case the addition of a reducing agent such as sulfonate is often desirable.

After repulping, the fibers are dewatered and used to make paper or paperboard in a conventional manner. New strength agents may be added on recycling to replenish the strength agents depolymerized or degraded during the repulping stages. Depending upon the product application, the repulped fibers may be used alone or in combination with virgin hardwood or softwood fibers.

Various additives may be employed in carrying out the invention. For example, starch hydrolyzing enzymes such as amylase may be used to remove sizing, detergents may be used to solubilize coatings, alkali may be used to swell the fiber, protease activators such as reducing agents (i.e. sulfite) or metal salts such as $Zn^{2+}$ or $Ca^{2+}$, salts may be used to reduce the adhesion of the wet strength polymer, oxidizing agents such as peroxide, may be used to oxidize the wet strength polymer making it easier to hydrolyze by proteases, cellulase or hemicellulases may be used to remove the surface of the fiber and separate the wet strength resin from the fiber, and alkylating agents may be used to react with the wet strength resin making it easier to hydrolyze with the protease.

The following Example is provided for the purpose of illustrating the present invention and is not to be considered limiting in any manner.

EXAMPLE

Kymene, a polyamide wet strength agent manufactured by Hercules, Inc. was added to an aqueous solution of 50 mM tris (hydroxyethyl) aminomethane (TRIS) and 2 mM $CaCl_2$. The polyamide solution was divided into 16 samples and to each sample was added an enzyme as set forth in TABLE 1 below. The samples were incubated at 40° C. and pH 9 for 45 minutes. The solutions were centrifuged at 1,500 xg for 15 minutes, filtered through a 0.45 μm filter and analyzed by gel permeation chromatography (GPC) using a hydroxyethyl methacrylate gel (TSK G2500 PWXL) with a 0.5M ammonium acetate eluent. A DRI detector was used at $0.5 \times 10^{-3}$ DRI sensitivity. The GPC analysis qualitatively detected the presence of adipic acid, a common degradation product of Kymene, in some of the samples which is evidence that certain enzymes are effective for the molecular weight degradation of this polyamide and, therefore, are useful for improving the repulpability of fibrous materials containing this polyamide wet strength agent. While not all the enzymes were effective in degrading the particular wet strength resin under the conditions used in this example, it is anticipated that other enzymes would have been effective under another set of reaction conditions. In addition, other wet strength resins may be degraded using other enzymes.

TABLE 1

| Sample | Enzyme | Presence of Adipic Acid |
|---|---|---|
| 1 | Trypsin | D |
| 2 | Thermolysin | ND |
| 3 | Bromelain | D |
| 4 | Proteinase K | ND |
| 5 | Collagenase IA | ND |
| 6 | Ultrasil 53 | D |
| 7 | Elastase | ND |
| 8 | Dispase | ND |
| 9 | Pepsin | D |
| 10 | Collagenase B | ND |
| 11 | Papain | ND |
| 12 | Pronase E | ND |
| 13 | Ficin | ND |
| 14 | Subtilisin | ND |
| 15 | Alcalase | D |
| 16 | Savinase | D |

ND = Not detected
D = Detected

Having described the invention in detail and by reference to preferred embodiments thereof, it will be apparent that modifications and variations are possible without departing from the scope of the invention defined in the appended claims.

What is claimed is:

1. A method of repulping fibrous paper or paperboard sheet materials containing a polyamide wet strength resin which is crosslinked with epicholorhydrin which comprises reacting said fibrous materials with an enzyme selected from the group consisting of bromelain, pepsin, tyrspin, alcalase, savinase, and mixtures thereof, in an amount sufficient to hydrolyze said resin.

2. The method of claim 1 wherein said treatment is carried out at a temperature of less than about 70° C.

3. The method of claim 2 wherein said treatment is carried out at a temperature of about 20° to 50° C.

4. The method of claim 1 wherein said treatment is carried out at a pH of about 4 to 10.

5. The method of claim 1 wherein said enzyme is reacted with said fibrous material in an amount of about 1 to 4,000 units/g (dry fiber weight) of said fibrous material.

6. The method of claim 5 wherein said amount of said enzyme is about 10 to 50 units/g fiber.

7. The method of claim 1 wherein said polyamide wet strength resin is derived from adipic acid and diethylenetriamine.

8. The method of claim 1 wherein said enzyme is a mixture of two or more enzymes selected from the group consisting of bromelain, pepsin, trypsin, alcalase and savinase.

9. A method of treating fibrous paper or paperboard sheet materials containing a polyamide wet strength resin which is crosslinked with epichlorohydrin which comprises the steps of:
   (a) forming an aqueous slurry of said polyamide-containing, fibrous material;
   (b) adding to said slurry about 1 to 4000 units/g (dry fiber weight) of an enzyme selected from the group consisting of bromelain, pepsin, tryspin, alcalase, savinase and mixture thereof to effectively hydrolyze said polyamide resin, and (c) reacting said slurry containing said polyamide-containing, fibrous material with said enzyme at a pH of about 4 to 10 and a temperature of less than about 70° C.

10. The method of claim 9 wherein said temperature is about 20° to 50° C.

11. The method of claim 10 wherein said amount of said enzyme is about 10 to 50 units/g fiber.

12. The method of claim 9 wherein said enzyme is a mixture of two or more enzymes selected from the group consisting of bromelain, pepsin, trypsin, alcalase, and savinase.

* * * * *